United States Patent
Howard

(10) Patent No.: US 7,461,522 B2
(45) Date of Patent: Dec. 9, 2008

(54) LIGHT COMPONENT SEPARATION FROM A CARBON DIOXIDE MIXTURE

(75) Inventor: Henry Edward Howard, Grand Island, NY (US)

(73) Assignee: Praxair Technology, Inc., Danbury, CT (US)

(*) Notice: Subject to any disclaimer, the term of this patent is extended or adjusted under 35 U.S.C. 154(b) by 0 days.

(21) Appl. No.: 11/944,745

(22) Filed: Nov. 26, 2007

(65) Prior Publication Data

US 2008/0066494 A1 Mar. 20, 2008

Related U.S. Application Data

(62) Division of application No. 10/985,875, filed on Nov. 12, 2004.

(51) Int. Cl.
*F25J 3/00* (2006.01)

(52) U.S. Cl. .......................................... 62/617; 62/639

(58) Field of Classification Search ................... 62/617, 62/632, 639
See application file for complete search history.

(56) References Cited

U.S. PATENT DOCUMENTS

| | | | |
|---|---|---|---|
| 3,355,902 A | 12/1967 | Crawford et al. | |
| 4,185,978 A * | 1/1980 | McGalliard et al. | 62/634 |
| 4,511,382 A | 4/1985 | Valencia et al. | |
| 5,011,521 A | 4/1991 | Gottier | |
| 5,329,775 A | 7/1994 | Fiedler et al. | |
| 5,335,404 A * | 8/1994 | Ozaki et al. | 29/408 |
| 5,927,103 A | 7/1999 | Howard | |
| 5,956,971 A * | 9/1999 | Cole et al. | 62/623 |

OTHER PUBLICATIONS

Isalski, "Separation of Gases", Oxford Science Publications (1989).

* cited by examiner

*Primary Examiner*—Melvin Jones
(74) *Attorney, Agent, or Firm*—David M. Rosenblum

(57) ABSTRACT

A method of separating one or more first light components from a carbon dioxide containing gaseous mixture that contains at least 30 mole percent carbon dioxide. In accordance with the method, a feed stream composed of the carbon dioxide is cooled to effect at least in part, liquefaction of the carbon dioxide containing gaseous mixture. The feed stream and a stripping gas stream are introduced into a liquid-vapor contact column to initiate counter-current vapor liquid mass transfer and the formation of a gaseous column overhead stream and a liquid column bottoms stream. The stripping gas stream contains one or more second light components having boiling point lower than that of carbon dioxide and higher than that of the first light component(s) to enrich the gaseous column overhead stream with the first light component(s).

18 Claims, 3 Drawing Sheets

LIGHT COMPONENT SEPARATION FROM A CARBON DIOXIDE MIXTURE

RELATED APPLICATIONS

This is a divisional application of application Ser. No. 10/985,875, filed Nov. 12, 2004.

FIELD OF THE INVENTION

The present invention relates to a method of recovering one or more light components from a carbon dioxide containing gaseous mixture that contains at least 30 mole percent carbon dioxide. More particularly, the present invention relates to such a method in which the carbon dioxide containing gaseous mixture and a stripping gas are subjected to counter-current vapor liquid mass transfer within a liquid-vapor contact column to produce a gaseous column overhead enriched with the one or more light components.

BACKGROUND OF THE INVENTION

Helium occurs naturally in very low concentrations within underground natural gas and carbon dioxide reservoirs. In some instances, helium is present at sufficiently high concentrations to justify its recovery. In general, helium can be effectively recovered from gas streams containing at least 0.1 mole percent helium or greater. In such recovery methods, helium is first concentrated into a crude helium stream that contains approximately 70 mole percent helium. The crude helium may then be stored, typically in an underground reservoir, or substantially further purified and liquefied for merchant sale.

There is a growing demand for large quantities of carbon dioxide in applications such as enhanced oil recovery. This demand has increased the interest of extracting valuable helium from such carbon dioxide-rich streams. It is to be noted that vast quantities of carbon dioxide are processed in enhanced oil recovery applications, normally greater than 10,000 tons per day. The high unit value of helium can substantially improve overall project economics.

In the prior art, natural gas-hydrocarbon streams have been subjected to helium extraction. For instance, in U.S. Pat. No. 3,355,902 a gas stream that has an extremely high hydrocarbon content and a low helium and carbon dioxide content is cooled and then introduced into a fractionator to produce a column overhead stream that contains dissolved helium. Boil up is produced within the fractionator by heating the liquid column bottoms. The helium rich overhead is further cooled, flashed and separated in several stages to provide a crude helium product.

U.S. Pat. No. 5,329,775 discloses a helium production system for separating helium from a stream containing helium, hydrocarbons and carbon dioxide. Again the helium and carbon dioxide is present within a feed in very low concentrations. The feed is rectified within a liquid-vapor contact column to produce a tower overhead which is further cooled and phase separated to produce the helium containing stream.

Both of the patents mentioned above are not applicable to the recovery of helium from carbon dioxide containing streams obtained from known underground reservoirs in which carbon dioxide is present at a concentration, greater than about 30 mole percent. The low temperature processes illustrated in such patents would tend to freeze carbon dioxide and therefore would be ineffective. In both of these patents only a fraction of the feed is liquefied prior to the trace carbon dioxide removal step.

As will be discussed, the present invention provides a method of separating helium from a gaseous carbon dioxide containing feed that contains at least 30 mole percent in an energy efficient manner. Such method allows the carbon dioxide containing fraction to be repressurized and returned for use or storage at high pressure. In case of feed streams having a high content of light components, such as nitrogen, the recompression can be carried out in an energy efficient manner. With respect to the separated light components, the present invention is intended to be used with further known purification techniques to produce a crude helium stream that can be stored or further processed. As will be discussed, such method is also applicable to separating other light components such as hydrogen and neon from feed streams having a similarly high carbon dioxide content.

SUMMARY OF THE INVENTION

The present invention provides a method of separating at least one first light component from a carbon dioxide containing gaseous mixture that contains at least 30 mole percent carbon dioxide. The at least one first light component can be helium, neon or hydrogen or mixtures thereof. In accordance with the method, a feed stream composed of the carbon dioxide containing gaseous mixture is cooled to effect, at least in part, the liquefaction of at least part of the carbon dioxide containing gaseous mixture. At least a portion of the feed stream and stripping gas stream are introduced into a liquid-vapor contact column to initiate counter-current vapor liquid mass transfer, thereby to produce a gaseous column overhead stream and a liquid, bottoms stream. The stripping gas stream contains at least one second light component having a boiling point lower than that of the carbon dioxide and higher than that of first light component to enrich the gaseous column overhead of the liquid-vapor contact column with the at least one first light component. In this regard, the at least one second light component can be $CH_4$, $C_2H_4$, $C_2H_6$, $N_2$, Ar or $O_2$.

In such manner, the first light component, that can be helium, is separated so that the liquid column bottoms contains essentially none of the light components. As a result, the column bottoms can be returned for use in an energy efficient manner and in a state similar to that of the feed yet essentially devoid of the high value light gas component.

The carbon dioxide containing gaseous mixture can be at least partially liquefied through indirect heat exchange of the feed stream with at least part of the liquid column bottoms stream. The feed stream can be expanded after the indirect heat exchange and prior to entry into the liquid vapor contact column. This generates refrigeration that allows the pumping of at least part of the liquid column bottoms stream prior to the indirect heat exchange and the vaporization of the at least part of the liquid column bottoms streams after the indirect heat exchange to form a vaporized liquid column bottoms stream. This vaporized stream is a stream that can be returned back to a process, a pipeline or other source of the carbon dioxide containing gaseous mixture. Alternatively, the helium depleted carbon dioxide stream may be redirected to an active nearby EOR well or another natural storage reservoir. The expansion can be a joule-thomson expansion or an expansion that is accompanied by the performance of work. The work can be applied to the compressing of the liquid column bottoms stream. In fact, where the incoming feed stream is in a supercritical state, the feed stream can be subjected to both expansion with the performance of work and a joule-thomson expansion.

At least part of the liquid column bottoms stream can be expanded. At least part of the liquid column bottoms stream can be vaporized through the indirect heat exchange to form a vaporized liquid column bottoms stream. The indirect heat exchange can effect the liquefaction of part of the carbon dioxide obtaining mixture.

Where the feed stream is available from a low pressure source, the feed stream may be compressed prior to cooling. The heat of compression can be removed from the feed stream within an aftercooler and water can be separated from the feed stream within a phase separator and a dryer as are well known in the art. The vaporized liquid column bottoms stream can be compressed and the heat of compression can be removed from the vaporized liquid column bottoms streams after compression.

The heat exchange in the preceding specific embodiment of the invention, or any other embodiment for that matter, can further involve the exchanging of heat with a refrigerant stream circulating within a refrigeration circuit.

In another embodiment, the stripping gas stream, the liquid-vapor contact column, the gaseous column overhead stream and the liquid column bottoms stream, mentioned above, can be a first stripping gas stream; a first liquid-vapor contact column; a first column overhead stream; and a first liquid column bottoms stream, respectively. In such embodiment the first gaseous column overhead stream is cooled and at least partially condensed. At least part of the first gaseous column overhead stream and a second stripping gas stream are introduced into a second liquid-vapor contact column. This produces a second gaseous column overhead and a second liquid column bottoms stream. The second gaseous column overhead will typically have a higher concentration of the first light component than that of the first gaseous column overhead stream.

The carbon dioxide containing mixture can be at least partially liquefied by way of indirect heat exchange with the liquid column bottoms stream. The at least part of the first gaseous column overhead stream can be cooled in a second stage of indirect heat exchange with the second liquid column bottoms stream. The feed stream can be subjected to a first joule-thomson expansion occurring after the first stage of indirect heat exchange and prior to its introduction into the liquid-vapor contact column. The second liquid column bottoms stream can be subjected to a second joule-thomson expansion prior to the second stage of indirect heat exchange. The first liquid column bottoms stream can be pumped prior to the first stage of indirect heat exchange. The second liquid column bottoms can be warmed within the first stage of the indirect heat exchange.

In another specific embodiment, the gaseous column overhead stream, the liquid-vapor contact column and the liquid column bottoms stream can constitute: a first gaseous column overhead stream; a first liquid-vapor contact column; and a first liquid column bottoms stream, respectively. At least a portion of the first liquid column bottoms stream can be distilled in a second liquid-vapor contact column to form a second gaseous column overhead stream and a second liquid column bottoms stream having a lower concentration of the second light component than the first liquid column bottoms stream. Boil-up is produced within the second liquid-vapor contact column by heating liquid column bottoms produced therewithin. In such embodiment, a remaining portion of the second liquid column bottoms stream can be pumped and vaporized.

In any embodiment, further carbon dioxide can be removed from the gaseous column overhead stream to produce an enriched helium stream. The enriched helium stream can be separated into a crude helium stream and a helium depleted stream. The helium depleted stream can be pressurized and utilized as at least a portion of the stripping gas stream. The helium depleted stream can be combined with the liquid column bottoms stream before or after vaporization thereof.

BRIEF DESCRIPTION OF THE DRAWINGS

While the specification concludes with claims distinctly pointing out the subject matter that Applicant regards as his invention, it is believed that the invention will be better understood when taken in connection with the accompanying drawings in which:

In order to avoid needless repetition of explanation, the same reference numerals are utilized in the various figures to designate elements having the same function and description.

DETAILED DESCRIPTION

Figure 1:
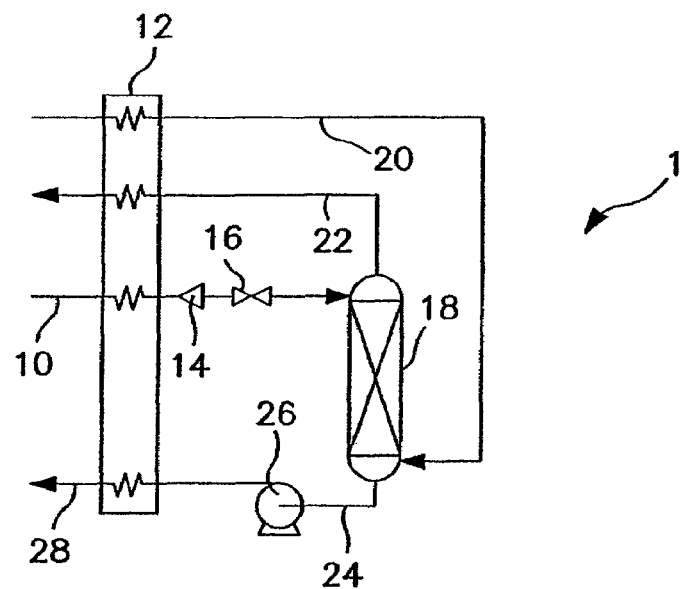
FIG. 1 is a schematic view of a process flow diagram in accordance with a method of the present invention directed at a supercritical pressure feed.

With reference to FIG. 1, an apparatus 1 is illustrated that is designed to separate helium from a feed stream 10 that in addition to the helium contains carbon dioxide. Although apparatus 1 and other embodiments disclosed herein have as their object the separation and recovery of helium, apparatus 1 and the other embodiments are equally applicable to separating and recovering other light components such as hydrogen and neon from carbon dioxide containing streams. Furthermore, it is understood that such other light components may be present within feed stream 10 alone or in addition to or without the helium as mixtures or as components of mixtures.

For exemplary purposes, feed stream 10 is at a temperature of between about 40° F. and about 120° F. and has a pressure of between about 1500 psig and about 3000 psig. Such a stream may be obtained from a pipeline used in connection with enhanced oil recovery or at the discharge of a carbon dioxide feed gas compressor and contains greater than 80 mole percent carbon dioxide, greater than 0.1 mole percent helium and other light gases ($N_2$, $CH_4$) typically in the range of 0.9 to 20 mole percent. It is worth pointing out that the degree of processing and therefore the expense involved in producing purified helium streams decreases with the amount of carbon dioxide present within the feed as contrasted with light components of more comparable boiling point to helium. As such, the process described above, or for that matter any process in accordance with the present invention becomes increasingly more attractive as the carbon dioxide content increases, for instance, above 50 mole percent and more preferably above 90 mole percent.

It is understood that apparatus 1 could be used to treat streams obtained from different sources and as such may essentially contain a single light component, for example, helium with the remainder carbon dioxide in similar high concentrations. In this regard, the gas to be treated preferably contains at least about 0.1 mole percent helium and more preferably greater than 0.5 mole percent helium.

If feed stream 10 is obtained from enhanced oil recovery processing, pretreatment may be required to remove such high boiling gases as water and hydrogen sulfide. As illustrated, feed stream 10 is cooled within a heat exchanger 12 to a temperature of between about −40° F. and about 40° F. After the cooling, feed stream 10 is introduced into a dense phase expander 14 that produces shaft work and further cools and depressurizes feed stream 10. Feed stream 10 is then further depressurized within a joule-thomson valve 16. As a result of the cooling and expansion, feed stream 10 is below the critical pressure of the respective mixture, is typically in the range of between about 1500 psia and about 1100 psia, and has been partially liquefied. The pressure of feed stream 10 after the expansion is preferably in a range of between about 450 psia and about 900 psia. It is understood that it is possible to use either the dense phase expander 14 or the joule-thomson valve 16 alone with the result of feed stream 10 possibly being at a higher pressure. It is also possible that the partial liquefaction of feed stream 10 be accomplished by cooling alone if it were obtained at a sub-critical pressure from a low pressure source.

The feed stream 10 is then introduced into a liquid-vapor contact column 18 that can have trays or preferably structured packing to produce between about 15 and about 30 theoretical stages of separation. At the same time, a stripping gas stream 20 is introduced into liquid-vapor contact column 18 which produces counter-current liquid vapor mass transfer to strip the light components and thereby produce a gaseous column overhead stream 22 and a liquid column bottoms stream 24.

Stripping gas steam 20 contains at least one second light component, for instance nitrogen, having a boiling point lower than the carbon dioxide and higher than that of helium or other light component to enrich the gaseous column overhead of liquid-vapor contact column 18 with the light component, namely helium. In this regard, gaseous column overhead stream 22 contains essentially all of the helium contained in feed stream 10. As will be discussed, stripping gas stream 20 may be obtained from downstream processing. However, stripping gas stream 20 may be obtained from external sources and constitute, for instance, air or nitrogen separated from an air separation unit. A further possibility is that the stripping gas stream 20 be methane obtained from a natural gas well or associated processing unit or pipeline. Flue gas that has been dehydrated and compressed could also be used for such purposes. In the case of flue gas, the residual carbon dioxide content of between about 5 and about 10 percent would have little impact upon gas stripping efficiency.

The second light component concentration of stripping gas stream 20 is at least about 25 mole percent and preferably more than about 50 mole percent. In addition to nitrogen, other possible second light components include such bulk atmospheric gases as argon and oxygen and mixtures thereof. Additionally, light hydrocarbons such as $CH_4$, $C_2H_4$, and $C_2H_6$ and mixtures thereof may also be used for such purposes. Such gases may be obtained from air, air separation units and/or natural gas processing units. Other potential candidates are $CF_4$ and $CHF_3$. In some instances, naturally occurring carbon dioxide feed gases include intermediary light gases such as nitrogen and methane which can be used as the stripping medium. As may be appreciated, mixtures of such gases as mentioned above as well as other gases and gas mixtures that are able to serve as a stripping gas are of possible use.

As a consequence of the separation outlined above, the liquid column bottoms stream 24 will have a helium content in parts per million and a second light gas content in the neighborhood of about 1 to 5 mole percent due to the introduction of stripping gas stream 20. As such, the liquid column bottoms of liquid-vapor contact column 18 is substantially free of the light components which have gone in the gaseous column overhead.

Liquid column bottoms stream 24 can be pumped by a pump 26 and then vaporized within heat exchanger 12 back to ambient to produce a vaporized liquid column bottoms stream 28 having a pressure in a range of between about 1000 psig and about 2500 psig. Thus, feed stream 10 is cooled in heat exchanger 12 by transferring heat to liquid column bottoms stream 24. Vaporized liquid column bottoms stream 28 may be further compressed or directed to a pipeline for use in an enhanced oil recovery process or for merchant liquid carbon dioxide production or returned to another well or underground storage facility.

Although, a single heat exchanger 12 is illustrated in which stripping gas stream 20 cools and gaseous column overhead stream 22 warms, it is understood that practically, heat exchanger 12 could be two heat exchangers. One heat exchanger would effectuate heat exchange between stripping gas stream 20 and gaseous column overhead stream 22. A separate high pressure heat exchanger of shell and tube design with high pressure passes could be used to effect heat exchange between feed stream 10 and liquid column bottoms stream 24. Such separation of heat exchange duty could be applied to any embodiment illustrated herein. Furthermore, it is also possible to not cool stripping gas stream 20 in that as could be appreciated by those skilled in the art, a very small flow of such gas would be required to displace the light components within feed stream 10. A yet further point worth mentioning is that apparatus 1 as will be illustrated by other embodiments may be replicated in a series of stages to successively purify the light component containing gaseous column overhead.

The following table illustrates a calculated example of the contents of the various streams that can be expected with the use of Apparatus 1.

| | Stream Number | | | |
|---|---|---|---|---|
| | 10 | 28 | 22 | 20 |
| Flow (lb mole/hr) | 1000.0 | 997.2 | 41.4 | 38.6 |
| Pressure (psia) | 2000.0 | 1965.0 | 880.0 | 881.0 |
| Temperature (Fahrenheit) | 100 | 95 | 8.8 | 16.7 |
| Carbon Dioxide [1] | 0.945000 | .925713 | 0.528252 | 0.0000 |
| Nitrogen [1] | 0.050000 | 0.074242 | 0.352097 | 1.000000 |
| Helium [1] | 0.005000 | 0.000045 | 0.119651 | 0.000000 |

Note
[1] Streams are in mole fraction.

Figure 2:
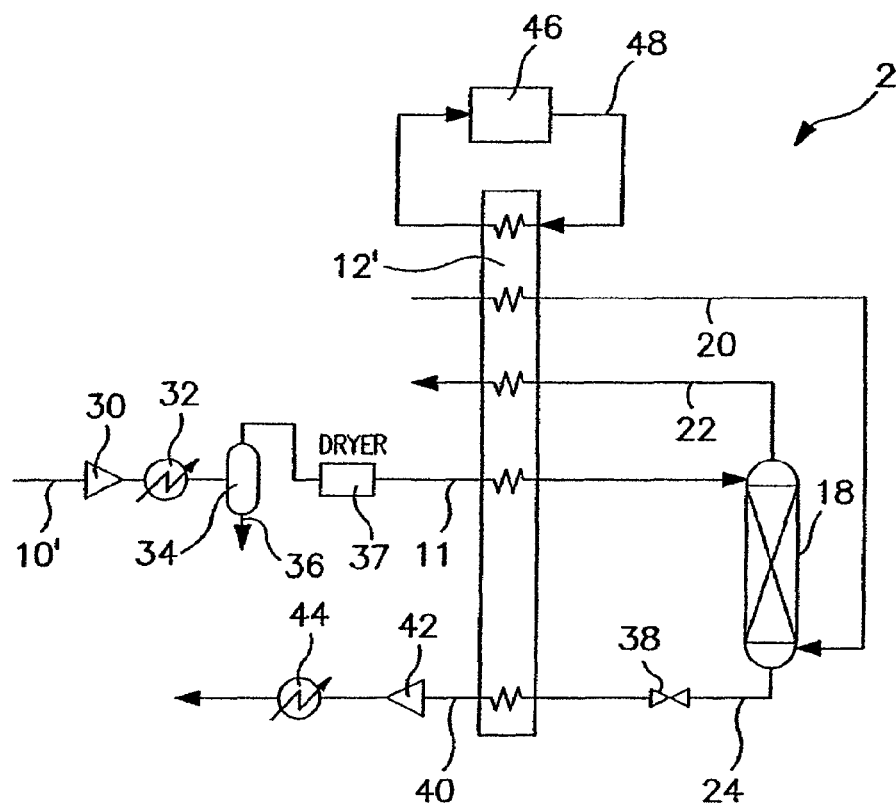
FIG. 2 is a schematic of an alternative embodiment of a method of the present invention directed at a sub-critical pressure feed.

With reference to FIG. 2, a feed stream 10' is made up of a carbon dioxide containing gas mixture to be processed within apparatus 2. Apparatus 2 is designed to process carbon dioxide containing feed streams that have been obtained at low pressure. Feed stream 10' is therefore, compressed within a compressor 30. The heat of compression is removed within an aftercooler 32 which may employ water, air, chilled water or the like as a cooling medium. As can be appreciated, compressor 30 and aftercooler 32 may be replaced with several stages of compression. After the cooling, feed stream 10' is introduced into a phase separator 34 to separate condensed water from feed stream 10' which is discharged as a water stream 36. In some instances, multiple stages of compression, aftercooling and water separation may be required.

Feed stream 10' is then further dried within a dryer 37 which may be a conventional glycol dryer or a known temperature swing adsorption unit to produce a purified feed stream 11. As is known, dryer 37 may also comprise elements that would enable the removal of heavier hydrocarbons and/or $H_2S$ or other sulfur compounds.

Purified feed stream 11 is preferably obtained from dryer 37 at a pressure of between about 450 psia and about 950 psia and then cooled within heat exchanger 12' and introduced into liquid-vapor contact column 18 along with stripping gas stream 20 and processed as described above with respect to apparatus 1. Liquid column bottoms stream 24 can be expanded in a joule-thomson valve 38 and is then vaporized within heat exchanger 12' which again could be made up of separate heat exchangers. The vaporized liquid column bottoms stream 40 can then be compressed within a compressor 42. The heat of compression can then be removed by an aftercooler 44 and the vaporized liquid column bottoms stream 40 can be directed to a pipeline or some other suitable use. It is to be noted, that liquid column bottoms stream 40 can be divided into two subsidiary streams and expanded to different pressures and then subsequently vaporized and compressed. A further alternative is to direct a portion of the vaporized liquid column bottoms stream 40 back to compressor 30 if a method in accordance with the present invention were conducted in which such stream contained non-negligible helium content.

As illustrated, an optional known refrigerator 46 can be provided having a refrigeration circuit 48 that provides cooling to heat exchanger 12'. Various refrigeration systems are applicable and include mixed gas refrigeration, pure component vapor compression refrigeration as well as gas expansion refrigeration such as reverse-brayton. It is to be noted, that although joule-thomson valve 38 is illustrated as being used in conjunction with refrigerator 46, in most cases, either joule-thomson valve 38 or the refrigerator 46 would be used alone. The use of refrigerator 46 would be applicable to any embodiment of the present invention. It is to be noted that the use of a dense phase expander from which work can be extracted can be used in place of a joule-thomson valve 38.

Figure 3:
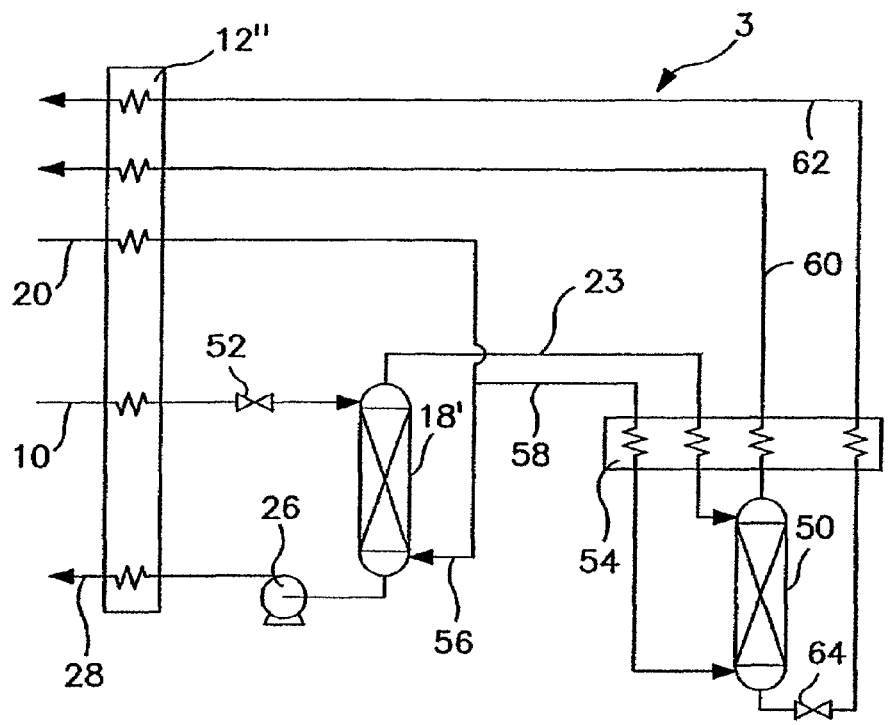
FIG. 3 is a schematic of a further alternative embodiment of the present invention detailing the use of consecutive or two stage gas stripping.

With reference to FIG. 3, an apparatus 3 is illustrated that is designed to further refine a first gaseous column overhead stream 23 within a second liquid-vapor contact column 50 having between about 15 and about 30 theoretical stages. In such embodiment, feed stream 10 is cooled within a heat exchanger 12" and subjected to an expansion by way of a joule-thomson valve 52. All or part of the resultant first gaseous column overhead stream 23 can be further cooled within a second heat exchanger 54 to a temperature of between about −10° F. and about −65° F. and introduced into second liquid-vapor contact column 50.

The stripping gas stream 20 after having been cooled within heat exchanger 12" is divided into first and second subsidiary stripping gas streams 56 and 58. As can be appreciated, such division can occur prior to heat exchanger 12" or first and second stripping gas streams 56 and 58 can be obtained from separate sources and may in fact be at ambient temperature. The first subsidiary stripping gas stream 56 is introduced into a bottom section of a first liquid-vapor contact column 18' which functions in the same manner as has been described above with respect to liquid-vapor contact column 18.

The second subsidiary stripping gas stream 58, after having been cooled within heat exchanger 54 to a temperature comparable to the first gaseous column overhead stream 23, is introduced into the bottom of the second liquid-vapor contact column 50 to produce counter-current liquid vapor contact and therefore a second gaseous column overhead stream 60 and a second liquid column bottoms stream 62.

Second liquid column bottoms stream 62 can be subjected to a joule-thomson expansion within a joule-thomson expansion valve 64. The second liquid column bottoms stream 62 and the second gaseous column overhead stream 60 can be introduced into the second heat exchanger 54 to help cool gaseous column overhead stream 28 and second subsidiary stripping gas stream 58.

As illustrated, second liquid column bottoms stream 62 and second gaseous column overhead stream 60 can be warmed within heat exchanger 12" or a separate heat exchanger to cool stripping gas stream 20. However, the cooling of stripping gas stream 20 is optional as well as providing a heat exchange to warm second liquid column bottoms stream 62 and second gaseous column overhead stream 60.

The advantage posed by this embodiment is that the flow rate of the second gaseous column overhead is in practice roughly one-half to one-tenth of that of first gaseous column overhead stream 23. As a potential option, second liquid bottoms stream 62, with or without warming within heat exchanger 12", may be taken as a product, recycled to a compressor or simply vented after vaporization. Further, gaseous column overhead stream 23 may be compressed and cooled prior to entry into heat exchanger 54.

Figure 4:
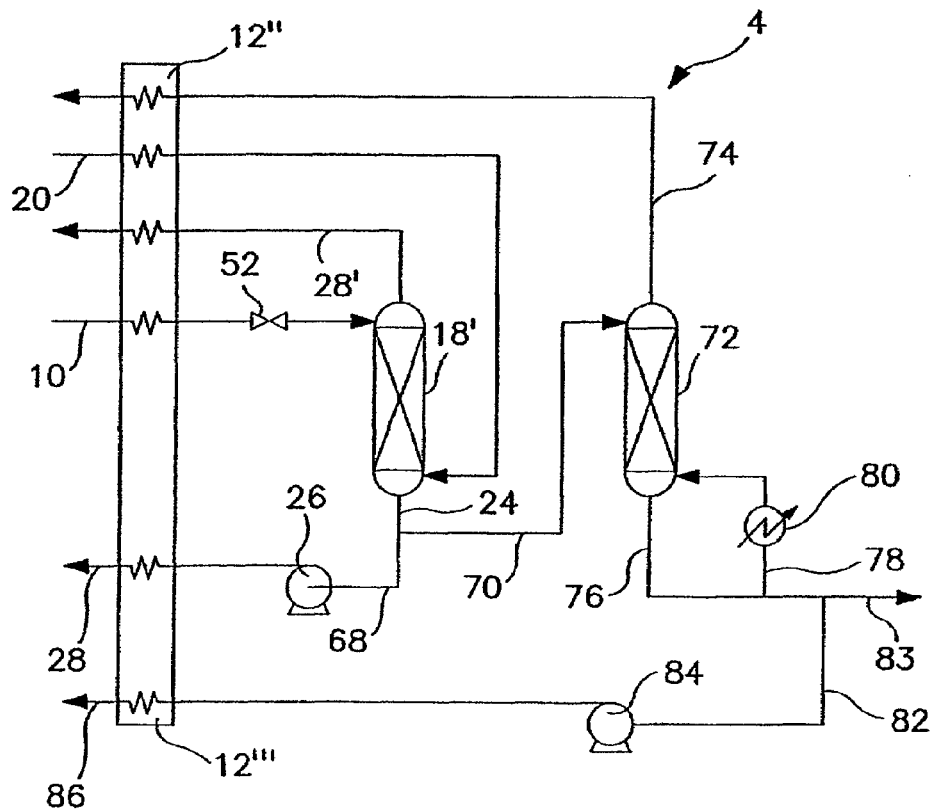
FIG. 4 is a schematic of a yet further embodiment of a method in accordance with the present invention and the complimentary use of distillation.

With reference to FIG. 4, an embodiment of the present invention is shown that utilizes an apparatus 4 designed to produce a carbon dioxide containing product that has a lower content of light components than similar products as have been described above. In such embodiment, liquid column bottoms stream 24 is divided into first and second subsidiary liquid column bottoms streams 68 and 70. First subsidiary liquid column bottoms stream 68 is pumped within pump 26 in a manner that has been described with reference to the embodiments illustrated in FIGS. 1 and 3. Feed stream 10 is introduced into a first liquid-vapor contact column 18' along with stripping gas steam 20 to produce a first gaseous column overhead stream 28' that is enriched in light components, for instance helium. First liquid-vapor contact column 18' functions in the same manner as column 18 to produce first gaseous column overhead stream 28' having the same makeup as gaseous column overhead stream 28 discussed in connection with apparatus 1.

Second subsidiary liquid column bottoms stream 70 is then distilled within a second liquid-vapor contact column 72 to form a further gaseous column overhead stream 74 and a further liquid column bottoms stream 76 that has a lower concentration of the light components than liquid column bottoms stream 24. Second liquid-vapor contact column can be provided with between about 10 and about 30 theoretical stages. Boil up is provided within liquid-vapor contact column 72 by heating a stream 78 within a process fluid heater 80 and recirculating stream 78 back to the bottoms section of liquid-vapor contact column 72.

Although first liquid-vapor contact column 18' and second liquid-vapor contact column 72 are illustrated as separate and distinct columns, the present invention encompasses the combination of such columns within a single column as separate sections. In such an arrangement at least a portion and perhaps all of vapor stream 74 is redirected to the base of a stripping section functioning in a like manner to that of first liquid-vapor contact column 18'. A further alternative would be to eliminate the use of pump 26 and take the majority of the liquid product to be vaporized as stream 82 as previously described. A yet further possibility is to retain separate columns but to combine part of stream 74 with stripping gas stream 20. All of such possibilities are intended to be covered in the claims.

An illustrated option is to pressurize a portion 82 of liquid column bottoms stream 76 within a pump 84. After pressurization, liquid column bottoms stream can be vaporized within heat exchanger 12''' to form a vaporized liquid column bottoms stream 86. Such a vapor stream can be further compressed for use in enhanced oil recovery or directed back to a high pressure pipeline or reservoir.

Figure 5:
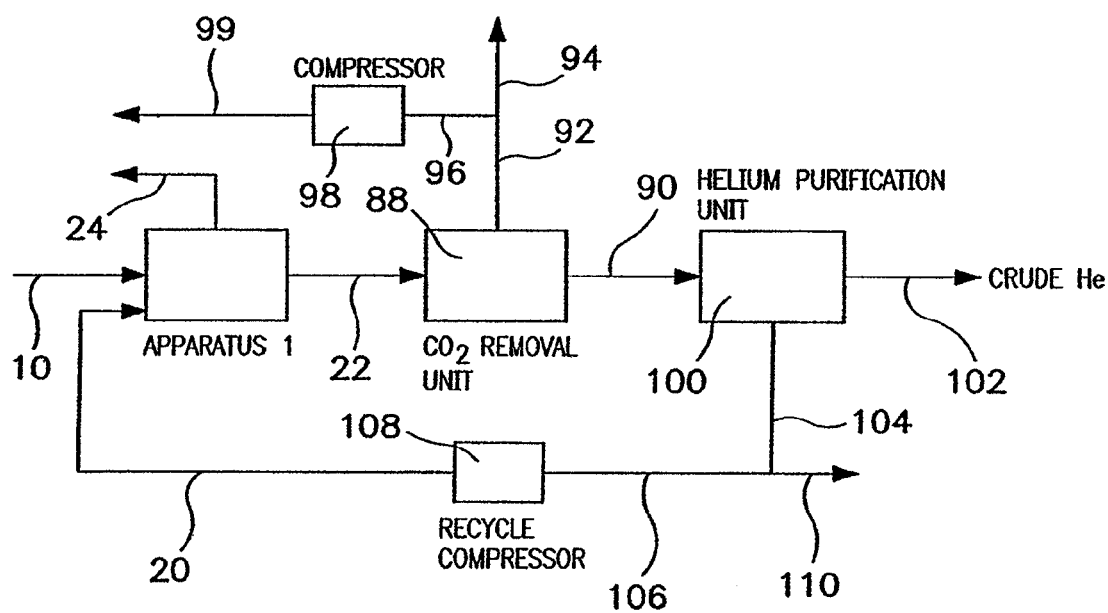
FIG. 5 is a schematic illustrating the context of the invention within the broader scope of crude helium manufacture.

With reference to FIG. 5, in any embodiment of the present invention, the gaseous column overhead stream 22 can be further processed to remove further carbon dioxide from such stream. For example, the gaseous column overhead stream 22 emanating from apparatus 1 can be introduced into a carbon dioxide removal unit 88 to remove residual carbon dioxide and thereby to produce an enriched helium stream 90 containing about 5 to about 35 mole percent helium and a residual carbon dioxide stream 92 containing approximately primarily carbon dioxide. Carbon dioxide removal unit 88 can be a known amine scrubbing unit or a pressure swing adsorption unit.

The residual carbon dioxide stream 92 can be divided into subsidiary streams 94 and 96. Subsidiary stream 94 is vented and subsidiary stream 96 is compressed by a compressor 98 and returned back to a pipeline or other process as a compressed carbon dioxide stream 99.

The enriched helium stream 90 can be further processed by a helium purification unit 100 that can be a known membrane or a cryo-distillation unit that functions in a known manner to produce a crude helium stream 102 containing about 70 mole percent helium. It is to be noted that carbon dioxide removal unit 88 and helium purification unit 100 are well known in the art. Although there are abundant references to the same, a specific reference can be found in W. H. Isalski, SEPARATION of GASES, Clarendon Press—Oxford 1989. A helium depleted stream 104 is rejected by the helium purification unit 100. Helium depleted stream 104, in accordance with the discussion herein is enriched with nitrogen, the second light gas, and can typically contain 99 mole percent or greater nitrogen or second light gas. All, or as illustrated, a part 106 of the helium depleted stream 104 can be compressed in a recycle compressor 108 to form the stripping gas stream 20. A remaining part 110 of helium depleted stream 104 can be vented or alternatively compressed back to the source pipeline or combined with liquid column bottoms stream 24 before or after vaporization thereof. In such combination step, it may be necessary to further process stream 104 by cooling and/or compressing.

Although the above discussion has been framed within the context of enhanced oil recovery or carbon dioxide obtained from a pipeline, the subject invention is equally applicable to a situation where the carbon dioxide might not be immediately used. In particular, helium laden well gases may exist near wells which have little or no helium. In such an instance the helium could be separated from the carbon dioxide in accordance with the present invention and the separated carbon dioxide stream could be disposed of or sequestered in a nearby well or reservoir until such time as it were needed. In this way the compression power imparted to the carbon dioxide containing stream would not lost.

While the present invention has been described with reference to a preferred embodiment, as will occur to those skilled in the art, numerous changes, omissions and additions may be made without departing from the spirit and the scope of the present invention.

I claim:

1. A method of separating at least one first light component from a carbon dioxide containing gaseous mixture containing at least about 30 mole percent carbon dioxide, said method comprising:

cooling a feed stream composed of the carbon dioxide containing gaseous mixture to effect, at least in part, the liquefaction of at least part of the carbon dioxide content of the feed stream through indirect heat exchange of the feed stream with at least part of a liquid column bottoms stream, thereby vaporizing the at least part of the liquid column bottoms stream to form a vaporized liquid column bottoms stream, the at least part of the liquid column bottoms stream being expanded prior to the indirect heat exchanger;

stripping the at least one first light component from at least a portion of the feed stream by introducing the at least a portion of said feed stream and a stripping gas stream into a liquid-vapor contact column to initiate countercurrent vapor liquid mass transfer thereby to produce a gaseous column overhead stream and the liquid column bottoms stream; and the stripping gas stream containing at least one second light component having a boiling point lower than that of the carbon dioxide and higher than that of the at least one first light component to enrich the gaseous column overhead stream with the at least one first light component.

2. The method of claim 1, wherein the at least one first light component is helium, hydrogen or neon.

3. The method of claim 1, wherein the second light component is $CH_4$, $C_2H_4$, $C_2H_6$, $N_2$, Ar or $O_2$.

4. The method of claim 1, further comprising:

prior to cooling said feed stream:

compressing said feed stream to pressurize the feed stream;

removing heat of compression from said feed stream within an aftercooler;

separating contaminants from said feed stream;

compressing the vaporized liquid column bottoms stream; and removing heat of compression from the vaporized liquid column bottoms stream after compression.

5. The method of claim 4 wherein the heat exchange further comprises exchanging heat with a refrigerant stream circulating within a refrigeration circuit.

6. A method of separating at least one first light component from a carbon dioxide containing gaseous mixture containing at least about 30 mole percent carbon dioxide, said method comprising:

cooling a feed stream composed of the carbon dioxide containing gaseous mixture to effect, at least in part, the liquefaction of at least part of the carbon dioxide containing gaseous mixture through indirect heat exchange of the feed stream with a refrigerant stream circulating within a refrigeration circuit;

stripping the at least one first light component from at least a portion of the feed stream by introducing the at least a portion of said feed stream and a stripping gas stream into a liquid-vapor contact column to initiate countercurrent vapor liquid mass transfer thereby to produce a gaseous column overhead stream and a liquid column bottoms stream; and the stripping gas stream containing at least one second light component having a boiling point lower than that of the carbon dioxide and higher than that of the at least one first light component to enrich the gaseous column overhead stream with the at least one first light component.

7. A method of separating at least one first light component from a carbon dioxide containing gaseous mixture containing at least about 30 mole percent carbon dioxide, said method comprising:
cooling a feed stream composed of the carbon dioxide containing gaseous mixture to effect, at least in part, the liquefaction of at least part of the carbon dioxide containing gaseous mixture;
stripping the at least one first light component from at least a portion of the feed stream by introducing the at least a portion of said feed stream and a first stripping gas stream into a first liquid-vapor contact column to initiate counter-current vapor liquid mass transfer thereby to produce a first gaseous column overhead stream and the first liquid column bottoms stream;
the first stripping gas stream containing at least one second light component having a boiling point lower than that of the carbon dioxide and higher than that of the at least one first light component to enrich the first gaseous column overhead stream with the at least one first light component;
cooling the first gaseous column overhead stream so as to be partially condensed; and
introducing at least part of the first gaseous column overhead stream and a second stripping gas stream into a second liquid-vapor contact column, thereby to produce a second gaseous column overhead stream and a second liquid column bottoms stream.

8. The method of claim 7, wherein the at least one first light component is helium, hydrogen or neon.

9. The method of claim 7, wherein the second light component is $CH_4$, $C_2H_4$, $C_2H_6$, $N_2$, Ar or $O_2$.

10. The method of claim 7, wherein:
said carbon dioxide containing mixture is at least partly liquefied in a first stage of indirect heat exchange of the feed stream and the first liquid column bottoms stream; and
the at least part of the first gaseous column overhead stream is cooled in a second stage of indirect heat exchange with the second liquid column bottoms stream.

11. The method of claim 10, further comprising:
subjecting said feed stream to a first joule-thomson expansion occurring after the first stage of indirect heat exchange and prior to its introduction into the first liquid-vapor contact column;
subjecting the second liquid column bottoms stream to a second joule-thomson expansion prior to the second stage of indirect heat exchange;
pumping the first liquid column bottoms stream prior to the first stage of indirect heat exchange; and
warming the second liquid column bottoms stream within the first stage of the indirect heat exchange.

12. A method of separating at least one first light component from a carbon dioxide containing gaseous mixture containing at least about 30 mole percent carbon dioxide, said method comprising:
cooling a feed stream composed of the carbon dioxide containing gaseous mixture to effect, at least in part, the liquefaction of at least part of the carbon dioxide containing gaseous mixture;
stripping the at least one first light component from at least a portion of the feed stream by introducing the at least a portion of said feed stream and a first stripping gas stream into a first liquid-vapor contact column to initiate counter-current vapor liquid mass transfer thereby to produce a first gaseous column overhead stream and a first liquid column bottoms stream;
the stripping gas stream containing at least one second light component having a boiling point lower than that of the carbon dioxide and higher than that of the at least one first light component to enrich the first gaseous column overhead stream with the at least one first light component;
distilling at least a portion of the first liquid column bottoms stream in a second liquid-vapor contact column to form a second gaseous column overhead stream and a second liquid column bottoms stream having a lower concentration of the second light component than the first liquid column bottoms stream; and
producing boil-up within the second liquid-vapor contact column by heating liquid column bottoms produced therewithin.

13. The method of claim 12, wherein the at least one first light component is helium, hydrogen or neon.

14. The method of claim 13, wherein the second light component is $CH_4$, $C_2H_4$, $C_2H_6$, $N_2$, Ar or $O_2$.

15. The method of claim 12, further comprising distilling the portion of the first liquid column bottoms stream in the second liquid-vapor contact column, pumping a remaining portion of the second liquid column bottoms stream, and vaporizing the remaining portion of the second liquid column bottoms stream.

16. A method of separating at least one first light component from a carbon dioxide containing gaseous mixture containing at least about 30 mole percent carbon dioxide, said method comprising:
cooling a feed stream composed of the carbon dioxide containing gaseous mixture to effect, at least in part, the liquefaction of at least part of the carbon dioxide containing gaseous mixture;
stripping the at least one first light component from at least a portion of the feed stream by introducing the at least a portion of said feed stream and a stripping gas stream into a liquid-vapor contact column to initiate counter-current vapor liquid mass transfer thereby to produce a gaseous column overhead stream and the liquid column bottoms stream;
the stripping gas stream containing at least one second light component having a boiling point lower than that of the carbon dioxide and higher than that of the at least one first light component to enrich the gaseous column overhead stream with the at least one first light component.
removing further carbon dioxide from the gaseous column overhead stream to produce an enriched helium stream; and
separating the enriched helium stream into a helium depleted stream and a crude helium stream.

17. The method of claim 16, further comprising pressurizing the helium depleted stream and utilizing said helium depleted stream as at least a portion of said stripping gas stream.

18. The method of claim 17, vaporizing the liquid column bottoms stream and combining the helium depleted stream with the liquid column bottoms stream before or after vaporization thereof.

* * * * *